Patented Feb. 14, 1928.

1,659,476

UNITED STATES PATENT OFFICE.

FELIX BAUMHAUER, OF MANNHEIM-WALDHOF, GERMANY, ASSIGNOR TO THE FIRM: DYNAMIDON-WERK ENGELHORN & CO., GESELLSCHAFT MIT BESCHRANKTER HAFTUNG, OF MANNHEIM-WALDHOF, GERMANY.

METHOD FOR PRODUCING HIGHLY-REFRACTORY MAGNESITE MASSES.

No Drawing. Application filed February 16, 1924, Serial No. 693,387, and in Germany February 20, 1923.

The invention relates to the producing highly refractory magnesite masses and to such masses and utensils, that possess an exceptional degree of constancy in volume, stability and resistance to changes in temperature. The invention makes possible the production of such products out of different starting-materials.

It has been found that highly refractory magnesite masses, constant in volume, stable under high temperatures and insensible to changes in temperature are obtained by reducing burnt magnesites or magnesia, poor in or free from fluxing agents into a finely distributed state, then compressing and compactly sintering same at temperatures below 1700° C. The reduction to refractory masses is effected according to well known methods. The products obtained according to the process show a remarkable chemical power of resistance.

The process is conducted in the following manner:

Magnesite poor in fluxing agents is caustically burnt and, after having been cooled, is ground to such a degree of impalpability that there remains an inappreciable residue on the sieve of 5000 meshes per sq. cm. An exaggerated powdering may turn out to be unfavorable under given circumstances. The powder obtained in this manner is briquetted and compactly sintered at about 1500 to 1600° C. In this manner the compressed bodies acquire a completely tight and compact grain, greatly resembling melted magnesite.

In place of grinding magnesia in dry state it can also be prepared according to the wet process. In such case it is advisable to caustically burn magnesite, poor in fluxing agents, in such a way that after the burning process it exhibits a maximum of water-absorbing power. The so burnt magnesite is then ground as above to the fineness of a sieve of 5000 meshes per sq. cm., and this with a small quantity of water in excess of that which is required for the hardening operation. When the paste is heated for a short period, the mass becomes stiff, with development of heat. Thereupon the hydrate of magnesium formed is briquetted and compactly sintered at 1500 to 1600° C.

The material obtained by the foregoing ways is in the known manner crushed, granulated, ground and sifted, and with the addition of cribbled fine powder that has traversed a sieve with 5000 meshes per sq. cm. as a binding agent is shaped or compressed and reduced to bricks. In its natural state the sintered and crushed mass can be employed as mortar, mastic, coating- or fettling-material.

In dealing with the sinter-mass, from 5 to 10% of caustically burnt or hydrated magnesite can be added to act as a binding agent. An addition of a few percent of clay or other binding-agents facilitates according to the circumstances the shaping without essentially reducing the fire-proof quality. In shaping also combustible binding agents, such as starch, tar or its equivalents can be made available under given circumstances.

It has been furthermore found that magnesite masses of unrivalled stability and insensibility to changes in temperature can be produced from raw magnesites, containing no or only a limited percentage of flux-accelerating agents, in the event that these magnesites are not sintered but melted. To ensure such effect any magnesite containing only a slight amount of lime can be made available. Even ferriferous magnesites can be employed as a starting material if during the melting process care has been taken to reduce and separate out the ferric combinations. At all events magnesites poor in iron are best suitable and also to be preferred from an economical point of view.

According to the present process magnesites, preferably those containing a possible minimum of lime and iron, are melted in a convenient way, this being done in the electric arc- or resistance furnace. The melted mass is crushed and the coarse-grained material is used, with the addition as a binding agent, of melted magnesite, ground to the high degree of impalpability. Besides melted fine material sintered or caustically burnt magnesite or magnesia enter into account. The masses obtained can serve either immediately—without being brought into shape—in form of mortar, mastic, coating, fettling material or, by means of compression, they are shaped into bricks and keenly burnt.

Both raw and previously sintered or else caustically burnt magnesite can serve as a starting material for the melting process.

Also artificially produced magnesia can be used provided that it is sufficiently free from flux-accelerating agents.

When using ferriferous magnesites the process should be conducted in such a way that in the melting operation the iron is reduced as much as possible for subsequent operation thus allowing its removal from the melted mass after comminution by means of magnets.

It is a surprising fact that the melted magnesite can be bound by nonplastic fine material of the same kind. The best proportion in which to add this finely ground melted material to the granulated material is an addition of from 10 to 20%.

As before mentioned a portion of this melted binding agent can also be replaced by sintered or caustically burnt magnesite material or by magnesia. With a view to give a greater resisting power to the compressed or moulded composition prior to submitting it to the burning process, an easily applicable binding agent such as tar, dextrin or its equivalents can be added.

The dressing of the masses and the burning of the raw-formed bricks are done in the manner used in the industry of refractory materials. They should be burnt as keenly as possible.

Compositions produced and articles burnt in this way possess a fire-proof quality exceeding by far 2000° C. They are constant in volume and yet absolutely stable when exposed to strong pressure at highest temperatures. This makes it possible to construct highly strained walls with magnesite-bricks, produced according to the present method, even for excessively heated kilns, without having to risk signs of softening or crumbling.

The melted magnesite masses stand strong changes in temperature without cracking. Even quick heating up or sudden cooling down has no effect on it.

Further the masses possess increased resistance to chemical attacks and scorifying substances.

Claims:

1. The method of making a refractory, which comprises melting magnesite containing an iron compound as an impurity, and reducing the iron, grinding the product, separating substantially all of the iron, granulating the product and binding the same with finely ground product.

2. The method of making a refractory, which comprises melting magnesite, granulating the product and adding to the product finely ground sintered magnesite sufficient to bind the same.

3. The method of making a refractory, which comprises calcining magnesite substantially free of fluxing material, pulverizing, and pressing the calcined magnesite into shapes, sintering it at temperatures slightly below 1700° C., granulating the product and adding to the granulated sintered product finely ground sintered product sufficient to bind the same.

In testimony that I claim the foregoing as my invention, I have signed my name.

FELIX BAUMHAUER.